(12) United States Patent
van de Beek et al.

(10) Patent No.: US 6,628,926 B1
(45) Date of Patent: Sep. 30, 2003

(54) METHOD FOR AUTOMATIC FREQUENCY CONTROL

(75) Inventors: Jaap van de Beek, Sundbyberg (SE); Christer Hedqvist, Stockholm (SE); Par Stigmer, Lund (SE)

(73) Assignee: Nokia Networks Oy, Espoo (FI)

( * ) Notice: Subject to any disclaimer, the term of this patent is extended or adjusted under 35 U.S.C. 154(b) by 469 days.

(21) Appl. No.: 09/686,042

(22) Filed: Oct. 11, 2000

(51) Int. Cl.[7] ................................................. H04B 1/40
(52) U.S. Cl. ...................... 455/75; 455/192.1; 375/326; 375/344
(58) Field of Search ................................. 455/75, 192.1, 455/192.3, 208, 254, 265; 375/326, 344, 354, 365; 370/216

(56) References Cited

U.S. PATENT DOCUMENTS

| | | | | |
|---|---|---|---|---|
| 6,134,286 A | * | 10/2000 | Chennakeshu et al. | 375/365 |
| 6,373,858 B1 | * | 4/2002 | Soleimani et al. | 370/346 |
| 6,463,266 B1 | * | 10/2002 | Shohara | 455/196.1 |
| 6,490,010 B1 | * | 12/2002 | Shibuya et al. | 375/326 |

FOREIGN PATENT DOCUMENTS

| | | | | |
|---|---|---|---|---|
| WO | 2 344 493 A | 6/2000 | ......... | H04L/27/233 |
| WO | WO 00/48334 | 8/2000 | ............ | H04B/7/26 |

OTHER PUBLICATIONS

A Frequency Synchronization for TDMA System, Hyoung-kyu Song, IEEE 1999, 1089–7798/99.
AFC Circuit with Fast Acquisition for a TDMA Cellular Mobile Communication System, Y. Ohishi, E. Fukoda, T. Kubo, T. Takano and Y Daido, 1991 IEEE, CH2944–7/91/0000/0181.
Automatic frequency control in EDGE from optimal algorithm to ASIC design, Christer Hedqvist, Par Stigmer, NOKIA.

* cited by examiner

Primary Examiner—Lee Nguyen
(74) Attorney, Agent, or Firm—Cohen, Pontani, Lieberman & Pavane

(57) ABSTRACT

A radio signal transmitted from a transmitter to a receiver of a mobile communications system, such as the GSM system, often suffers from a phenomenon known as frequency offset by which the frequency of the radio signal is changed from a first frequency to a second frequency. A method is therefore provided for automatically correcting the frequency at the receiver to restore the received radio signal to approximately the first frequency using a multistage frequency correction algorithm. The radio signal comprises a training sequence that is known to the receiver and data symbols that are not known to the receiver. In the first stage of the frequency correction, the frequency offset is coarsely estimated based on the training sequence only, and the data symbols are frequency corrected by back-rotating the received data symbols and the training sequence by the frequency offset estimate. The frequency corrected data symbols and training sequence are then input into the second stage of the frequency correction where they are used to determine a second estimate of the frequency offset that should be more accurate because the second estimate of the frequency offset is based on a larger number of symbols including symbols in the previously frequency corrected training sequence and data symbols. Using this second frequency offset estimate, the data symbols in the received radio signal are frequency corrected by back-rotating the received data symbols by the second frequency offset estimate and are output for detection.

20 Claims, 4 Drawing Sheets

RECEIVER 20
PRIOR ART

METHOD FOR AUTOMATIC FREQUENCY CONTROL

BACKGROUND OF THE INVENTION

1. Field of the Invention

This invention relates to a method of automatic frequency correction of a received radio signal in a digital mobile communications system.

2. Description of the Related Art

In a digital mobile communications system, such as a GSM (Global System For Mobile Communication) system, data is transferred, referring to FIG. 1, between a transmitter 10 and receiver 20 as a radio signal over a physical channel which may use frequency and/or time division multiplexing to create a sequence of radio frequency channels and time slots. Typically, every frequency band is divided into many time division multiple access (TDMA) frames, with eight users per frame, each user being allocated time to send a single burst of information. The precise frequencies used vary by country. The physical channel over which the signal is sent is unknown to receiver 20. FIG. 2 illustrates a representative structure of receiver 20 in which the burst 30 is received by antenna 35, the signal is amplified by amplifier 40, and passes through filters and mixers 50. The signal is then converted from an analog to digital by A/D converter 60.

In a GSM system, the data to be transferred, whether modulated by EDGE (Enhanced Data Rates for Global System For Mobile Communication Evolution), GMSK (Gaussian Minimum Shift Keying), or some other scheme, is formed into a burst containing a sequence of 156.25 complex symbols (each symbol having a real and imaginary part). 156.25 symbols is the number of symbols that, by definition, fit into a single timeslot for transmission by transmitter 10.

A normal burst 100 in a GSM system, as shown in FIG. 3, is comprised of six components: a first "tail bits" field comprising three symbols 105, a first set of 58 symbols of encrypted data 110, a training sequence (or "pilot symbols") 120 of 26 symbols in length and known as a mid-amble because it comes between two data fields, a second set of 58 symbols of encrypted data 130, and a second "tail bits" field 135 comprising three symbols (not shown), and a guard period 137 which is empty and extends for a period equivalent to 8.25 symbols. The size of these fields shown in FIG. 3 are not drawn to scale. In the GMSK modulation scheme, a symbol is equivalent to a bit so there are 148 bits in a burst. In the EDGE/8PSK modulation scheme, a symbol corresponds to three bits so there are 444 bits in a burst. See GSM 05.02 §5.2 *Bursts* (*Digital Cellular Telecommunications System* (*Phase 2+*); *Multiplexing and Multiple Access on the Radio Path; Version* 8.1.0 *Release* 1999). The training symbols are known to the receiver in advance of receiving the burst; the data symbols are not known to the receiver in advance.

In a digital mobile communications system, the frequency of a burst as it is received as a signal by receiver 20 frequently varies from the burst that is sent by a certain amount of "frequency offset." FIG. 4 illustrates the effect of a frequency offset. A signal 140 having a real part (represented by the x-axis) and an imaginary part (represented by the y-axis) is transmitted from point I to be received at point II. As is shown with specific regard to point A-E, while the real part of the signal remains constant, the phase of the signal changes relatively radically with time (represented by the z-axis). FIG. 5 illustrates the performance of a GSM system employing 8PSK modulation without any frequency correction which results in a high bit-error rate. On the x-axis is the signal-to-noise ratio in dB. The y-axis represents the bit-error rate. The curve labeled "0 Hz" shows the bit-error rate performance if the system is not disturbed by any frequency offset, as is the case in an ideal world. Clearly, in such a case, there is no need for frequency correction and the 0 Hz curve shows the best results that can be obtained in this system. The other four curves in FIG. 5 show the bit-error rate of the same system (without any frequency correction) if the system is subject to frequency offsets. Clearly, the bit-error rate becomes high for a frequency offset of 100 Hz or higher. For example, a frequency difference of 100 Hz in a GSM system causes the phase of a signal to change by almost 20 degrees during a burst.

Where the transmitted burst is a constant signal, that is, the transmitter 10 does not intentionally vary the phase of the transmitted signal, the receiver 20 observes a time-varying phase during the receipt of the signal at the receiver because of an undesired frequency offset, which must be accounted for and corrected at the receiver end of the system. This undesired frequency offset has two causes. One cause is the oscillators in the transmitter 10 and receiver 20 that usually do not have exactly the same frequency, although ideally these frequencies should be the same. Another cause of the frequency offset is movement of the receiver 20. As a receiver 20 moves toward the transmitter, the Doppler-effect will cause a frequency change. A speed of 100 km/h, for example, causes a frequency offset of about 100 Hz and a phase change of almost 20 degrees. Both causes of frequency offset can occur simultaneously and the effects can be cumulative.

The frequency offset presents a more significant problem in a communication system, particularly in a system, device or product which has a high sensitivity to frequency errors, such as the modulation scheme in the EDGE-GSM system where a phase change to the transmitted signal is intentionally introduced as a means of inserting desired information into the signal. The receiver 20 must be able to detect from the phase of the received signal the information bits that were transmitted. However, receiver 20 cannot distinguish between phase changes due to the transmitted information and phase changes introduced by the frequency offset. If receiver 20 ignores the presence of a frequency offset and treats the received signal as if there were no frequency offset, the transmitted message will be incorrectly detected at the receiver 20, which would analyze and interpret the phase changes introduced by the frequency offset as if they were intentionally inserted by the transmitter 10.

There must therefore be a method of accounting and compensating for the signal distortion caused by the frequency offset, especially in EDGE systems, where a cumulative phase rotation of as much as 40 degrees in our example can seriously affect performance. Because there is no way of measuring the frequency offset, the prior art describes a method of correcting the frequency offset by estimating the frequency offset at digital signal processor 70 (FIG. 2), as described below, based on the training symbols 120 from the received burst, which training symbols the receiver 20 knows before the burst is received. The unknown frequency offset $\phi$ of the received signal is modeled as a phase rotation $e^{j\phi k}$ introduced into the signal. Once the frequency offset $_\phi$ is determined, the offset $_\phi$ can be corrected and compensated for by back-rotating the signal over an angle $_\phi$ using a prior art digital signal processor structure represented by FIG. 6.

The prior art estimator is based on the model of the received signal shown in FIG. 7. A burst x(k) is sent through a channel having impulse response (or "tap") h(k) and received as signal z(k). The frequency offset $\phi$ is a function of the channel impulse response h(k) which the signal is transmitted, but because h(k) is unknown by receiver 20 h(k) is not provided and must be estimated. In addition to the modeling of phase rotation $e^{j\Phi k}$, the model of received signal z(k) also accounts for additive white noise w(k), which represents impairments caused by fading, multipath propagation, channel dispersion, additive noise, etc., that are introduced into the burst x(k) by things such as physical objects in the path of propagating radio waves. The frequency offset $\phi$ is thus modeled mathematically as:

$$z(k) = (x*h)(k) \cdot e^{j\varphi k} + w(k). \qquad (1)$$

This can be described in matrix notation as $$z = \Phi X h + w \qquad (2)$$

$$\text{where } \Phi = \begin{bmatrix} e^{j o\varphi} & & & \\ & e^{j o\varphi} & & \\ & & \ddots & \\ & & & e^{j(N-H+1)\varphi} \end{bmatrix} \qquad (3)$$

A linearization of $e^{j\Phi} \approx 1 + j\phi$ is introduced to reduce the complexity of the mathematical expression making $\Phi \cong I + \phi R$, which permits z to be restated as:

$$z = Xh + \phi RXh + w \qquad (4).$$

In equations (2) and (4), X is the (N−H+1)×H Toeplitz convolution matrix where:

$$X = \begin{pmatrix} x_H & x_{H-1} & x_{H-2} & \cdots & x_1 \\ x_{H+1} & x_H & x_{H-1} & \cdots & x_2 \\ x_{H+2} & x_{H+1} & x_H & \cdots & x_3 \\ x_{H+3} & x_{H+2} & x_{H+1} & \cdots & x_4 \\ \vdots & \vdots & \vdots & \ddots & \vdots \\ x_N & x_{N-1} & x_{N-2} & \cdots & x_{N-H+1} \end{pmatrix} \qquad (5)$$

containing a portion $x_H \ldots x_N$ of the known transmitted training sequence $x_1 \ldots x_N$, R is an (N−H+1)×(N−H+1) matrix:

$$R = j \begin{bmatrix} 0 & & & & \\ & 1 & & & \\ & & 2 & & \vdots \\ & & & & (n-H+1) \end{bmatrix} \qquad (6)$$

h denotes an (H×1) vector containing the estimated channel taps:

$$h = \begin{bmatrix} h_1 \\ \vdots \\ \vdots \\ h_H \end{bmatrix} \qquad (7)$$

and w~N(0, $\sigma_w^2$I) is the additive white Gaussian noise vector. In a typical implementation of the invention, the value of "H" is chosen as a fixed parameter. The length of the channel impulse response in the system determines the value of "H". Typical values in a GSM system, for instance, are between 4 and 7, as typical impulse responses have a length of 4 to 7 symbol intervals.

There are basically two possibilities to implement the value of the noise variance $\sigma_w^2$ in the invention. The first possibility is to use a fixed value for this parameter which is chosen to reflect typical values of the noise variance in the system. (Typical signal-to-noise ratios in a wireless communication link fall between 0 and 10 dB. With a normalized signal in the receiver, typical values of the noise variance fall between 0.1 and 1.) The second possibility is, very much like the channel impulse response, to estimate the noise variance and use the estimated value in the proposed frequency offset estimator. The estimation of the noise variance is extensively described in the prior art and is known to one of ordinary skill in the art.

The convolution matrix X used in the prior art to compute z takes into account channel distortion in the transmission of the radio signal by adding in a weighted sum of the values of the H−1 symbols prior to symbol $x_H$. This creates a smearing effect which would cause the estimate of the first H−1 symbols to be based on values that include the uncorrected and unknown values of data symbols 110 preceding the training symbols. Therefore, to eliminate smearing effects from the model, although x(k) is known for all symbols in the transmitted training sequence 120, the first H−1 symbols in z(k) are disregarded and the X matrix of equation (5) starts with $x_H$ rather than $x_1$. For example, where H=5, if symbol $x_1$ were included in matrix X, the value of z(k) would add to the model for computing frequency offset estimate $\phi$ unknown symbols $x_0, x_{-1}, x_{-2},$ and $x_{-3}$.

The frequency offset estimate $\phi$ may be calculated either as a least-square (LS) estimate or as a linear minimum mean-squared error (LMMSE) estimate of $\phi$. The LS estimate is calculated by $$\hat{\phi}_{LS} = Re\{(h^H X^H R^H R X h)^{-1} h^H X^H R^H z\} \qquad (8)$$

and the LMMSE estimate of $\phi$ is calculated by $$\hat{\varphi}_{MMSE} = Re\left\{h^H X^H R^H \left(h^H X^H R^H R X h + \frac{\sigma_w^2}{\sigma_\varphi^2}\right)^{-1} z\right\} \qquad (9)$$

where $\sigma_\phi^2$ is the variance of the unknown frequency offset, generally chosen as a fixed design parameter. The value of the variance $\sigma_\phi^2$ is fixed and is chosen to reflect typical values of the number of radians the received signal changes from one symbol to the next because of a frequency offset in the system. Typically, in a GSM system, a true frequency offset is 200–300 Hz and, therefore, a GSM signal changes about 2250/270833 radians per symbol. A typical fixed value of $\sigma_\phi^2$ would thus be (2250/270833)$^2$. The value of $\sigma_w^2$ is either estimated or also chosen as a fixed parameter, as described above.

The estimators of equations (8) and (9) assume that the channel taps h(k) at the receiver 20 are known. Since the channel vector h is not actually known, a channel estimator also operates on the received burst to determine a channel estimate which is inserted into equations (8) and (9). One method of estimating the channel is with the equation:

$$\hat{h}_{LS} = (X^H X)^{-1} X^H z \qquad (10)$$

In the frequency correction structure 135 of FIG. 6, the signal z(k) is received by receiver 20, after having been frequency offset, and is input at block 140 to a channel estimator 150 that calculates equation 10. The training sequence 120 is input to a frequency estimator 160 along with the computed channel estimate output from channel estimator 150, and the estimator 160 outputs an estimate of the frequency offset 165. Output 165 is input to a frequency corrector 170 shown in FIG. 7 along with the received signal z(k). The frequency corrector 170 corrects the frequency-offset data symbols 110, 130 by performing a back-rotation of $e^{-j\phi k}$ as shown in FIG. 7, and output as the signal $\hat{z}$ (k) to a detector 180 for further processing by receiver 20. The channel estimate $\hat{h}_{LS}$ output from channel estimator 150 is also input to detector 180.

The performance of detector 180 in terms of bit error rate is dependent upon the accuracy of the estimated frequency offset compared to the actual frequency offset. It is therefore imperative that the estimated frequency offset be calculated as accurately as possible. However, utilizing the LS estimate $\phi_{LS}$ or the LMMSE estimate $\phi_{MMSE}$ based solely on the training sequence 120, may not provide a sufficiently accurate result. Therefore, it would be advantageous to have a method of achieving a more accurate frequency correction.

SUMMARY OF THE INVENTION

It is an object of this invention to provide a method of relatively accurately estimating and correcting for a frequency offset to enable a receiver to recognize information inserted into the frequency corrected signal as a phase shift.

In accordance with this objective, the present invention provides a method of automatically correcting the frequency of a received radio signal for the effects of a frequency offset of unknown value that may be introduced during the transmission of the signal over a digital mobile communications link. The frequency of the received radio signal, which comprises data symbols not known to the receiver and a training sequence which comprises a sequence of symbols that are known to the receiver, is corrected for the frequency offset in two stages. In the first stage, which is identical to the prior art method described above, a first estimate of the frequency offset is calculated using mathematical modeling which models the frequency offset as a signal rotation over an angle $\phi_1$. The model estimates the frequency offset based on at least a portion of the training sequence and an estimate of the channel impulse response over which the signal is transmitted.

The channel estimate provides information of how the signal would have been distorted if there were no frequency offset in the system. This information is important to the frequency estimator since the linear distortion caused by the channel impulse response is "separated" from the distortion caused by the frequency offset. The frequency offset estimator does not have to bother about the first distortion, but, by having an estimate of the channel impulse response, the second source of distortion caused by the frequency offset can be focused on and corrected. The estimated frequency offset is then used to correct the frequency of the data symbols and training sequence a first time by back-rotating the data symbols over the angle $\phi_1$.

The resulting correction of the frequency offset $\phi_1$ in this first stage is generally imperfect and somewhat coarse because it is based on an estimate of the offset of a limited number of symbols, i.e. a portion of the training symbols. The frequency corrected data symbols and training sequence have a remaining frequency offset that may or may not be significant. The frequency corrected data symbols and training sequence are therefore input to a second stage of the frequency correction to attempt to improve upon and fine tune the frequency correction to reverse as much of the frequency offset as possible. In this second stage, a second estimate of the frequency offset $\phi_2$ is calculated using mathematical modeling which models the frequency offset as a signal rotation over an angle $\phi_2$. The model estimates the frequency offset based on the training sequence and at least a portion of the data symbols, using in the calculations an estimate of the channel over which the signal is transmitted. The second estimated frequency offset $\phi_2$ is then used to correct the frequency of the data symbols and training sequence a second time by back-rotating the data symbols over the angle $\phi_2$. The frequency corrected signal corrected for frequency offset $\phi_2$ is output for detection and further processing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF THE PRESENTLY PREFERRED EMBODIMENTS

Figure 6:
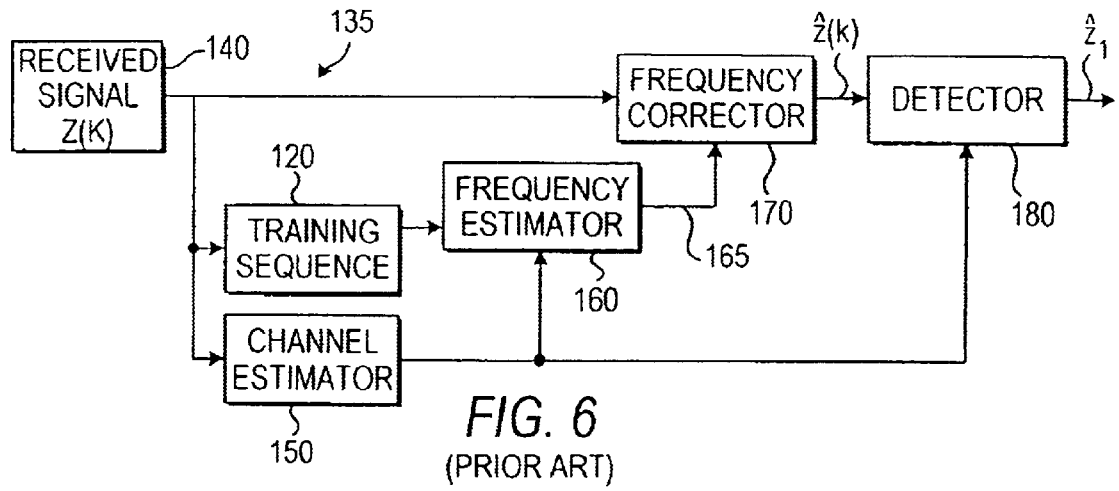
FIG. 6 is a block diagram of a prior art digital signal processor algorithm for frequency correction.
Figure 7:
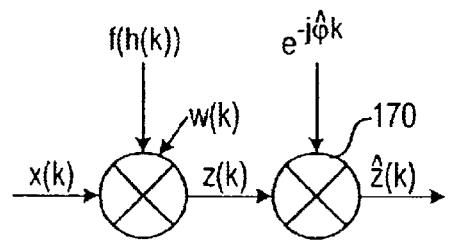
FIG. 7 is a block diagram of a prior art frequency correction structure which may also be used in the present invention.
Figure 8:
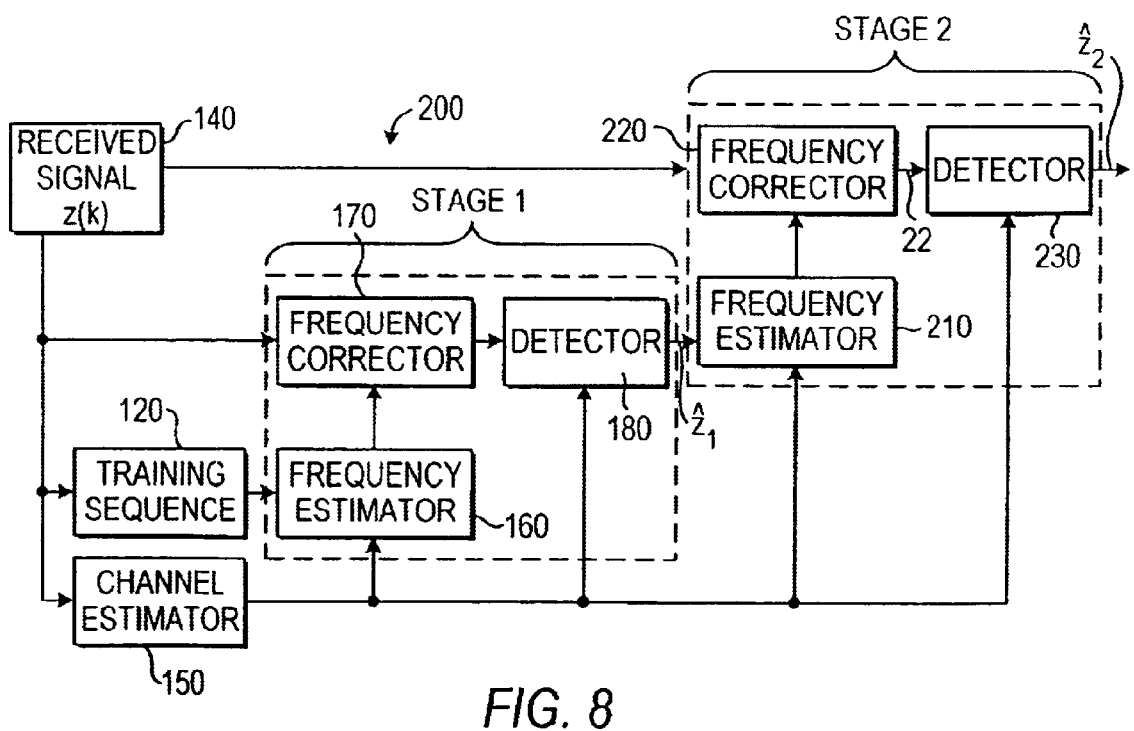
FIG. 8 is a block diagram of a digital signal processor algorithm for frequency correction according to the present invention.

The frequency correction structure 200 of the present invention, shown in FIG. 8, improves upon the prior art by performing a two stage frequency correction, labeled Stage 1 and Stage 2. To distinguish between the values of variables calculated at each of the two stages, variables calculated at Stage 1 are denoted with a subscript 1 and variables calculated at Stage 2 are denoted with a subscript 2. Stage 1 is identical to the prior art DSP structure 135 of FIG. 6 and therefore the methods and appropriate calculations need not be repeated. In Stage 1, a coarse estimate of frequency offset $\phi=\phi_1$ is produced and the frequency correction that is performed results in an output $\hat{z}_1$ that is a vector containing a fairly accurate estimate of the detected bits without a significant amount of the frequency offset in the signal x(k). $\hat{z}_1$ includes the frequency corrected data symbols 110, 130 and the training sequence 120 in the burst that have already been frequency corrected once. $\hat{z}_1$ is input to Stage 2 of receiver structure 200 where it is input to frequency estimator 210 along with received signal z(k). Also input to frequency estimator 210 is the channel estimate ĥ determined by channel estimator 150. The combination of data symbols 110, 130 and training sequence 120 in $\hat{z}_1$ assume the role in frequency estimator 210 that the training sequence 120 alone filled in frequency estimator 160, i.e. all symbols are assumed correct. Thus, in equation 4, Stage 1 is performed for 26-H training symbols, and Stage 2 is performed for 142-H symbols. Because it is based on more data samples than the frequency offset estimate in Stage 1, if the bit-error rate of the first receiver structure is not too high, the second frequency offset estimator 210 will determine a better estimate of the frequency offset $\phi_2$, in signal z(k), which signal is modeled as being rotated due to the frequency offset by $e^{j\phi k}$ where $\phi=\phi_2$. The assumption at frequency estimator 210 that all symbols are correct might appear strange at first because, of course, there are some errors. However, the error-rate of the first-stage decisions is often so low that the second stage can use all the decisions from the first stage to make a new, better second estimate. That is, there are so many correct symbols based on the first stage of correction, that the second stage can use these symbols and provide even better second-stage decisions.

The equations utilized for the frequency estimator 210, which are equations 4–10, are identical to the equations for performing Stage 1. However, matrix $X_2$ calculated using equation 4 is a larger matrix than the matrix $x_1$ and represents in Stage 2 data and training symbols $x_H \ldots x_{(N-H+1)}$ within symbols 110, 130, in their order of appearance within the burst. Some data symbols $x_1 \ldots x_{H-1}$ from symbols 110 are not included in matrix $X_2$ because of smearing effects that will otherwise result from the mathematical model which would lead to the inclusion of unknown symbols from the preceding burst in the model for computing the undesired frequency offset of the present burst.

An estimate of the frequency offset $\phi_2$ is output from frequency estimator 210 using either equations 8 or 9 to respectively calculate $\hat{\phi}_{LS}$ or $\hat{\phi}_{MMSE}$ for Stage 2; it has been found that the latter variable provides the more accurate calculation for the frequency offset estimate. The calculated remaining frequency offset estimate $\phi_2$ is inserted into the mathematical model for performing frequency correction at frequency corrector 220. The frequency correction for Stage 2 is performed by frequency corrector 220, which differs from the frequency correction at frequency corrector 170 in that the more accurate estimate of frequency offset $\phi_2$ is used for the frequency correction of the received signal z(k). Thus, the signal z(k) is back-rotated over $\phi_2$ to obtain the frequency corrected signal output $\hat{z}_2$, which is a frequency that is substantially the frequency of the signal x(k) at which transmitter 10 transmitted the burst 30. The output $\hat{z}_2$ from frequency corrector 220 is input to a detector 230 along with channel estimate ĥ. While $\hat{z}_2$ is corrected for the frequency offset, other distortions including distortions due to noise, a linear channel impulse response, etc., may still be present in this signal as it is input to detector 230 and may be separately corrected.

Figure 1:
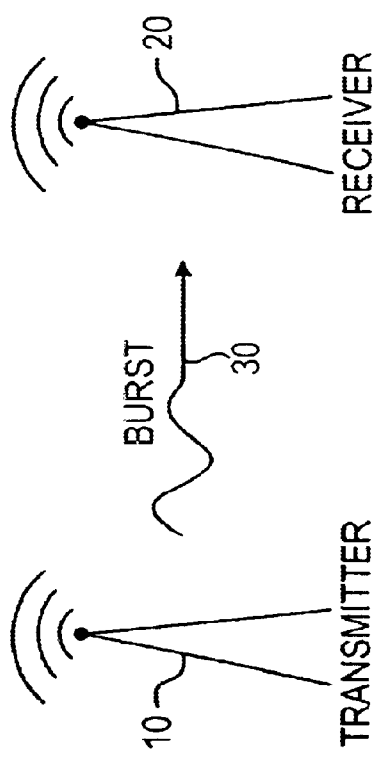
FIG. 1 is a block diagram of a digital communications system on which the present invention may be implemented.
Figure 2:
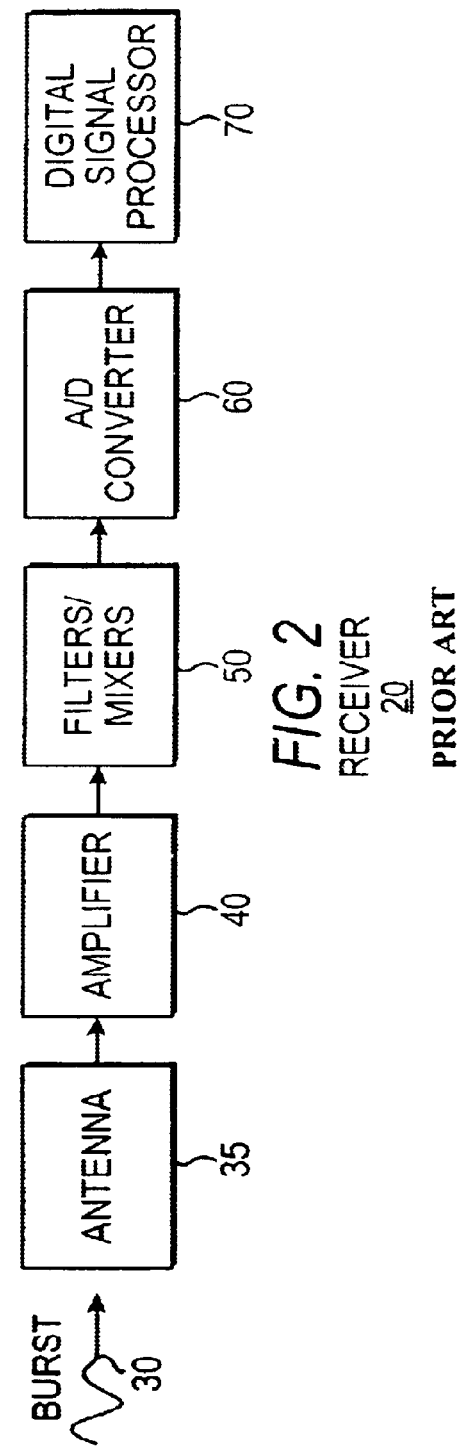
FIG. 2 is a block diagram of a prior art receiver structure.
Figure 3:
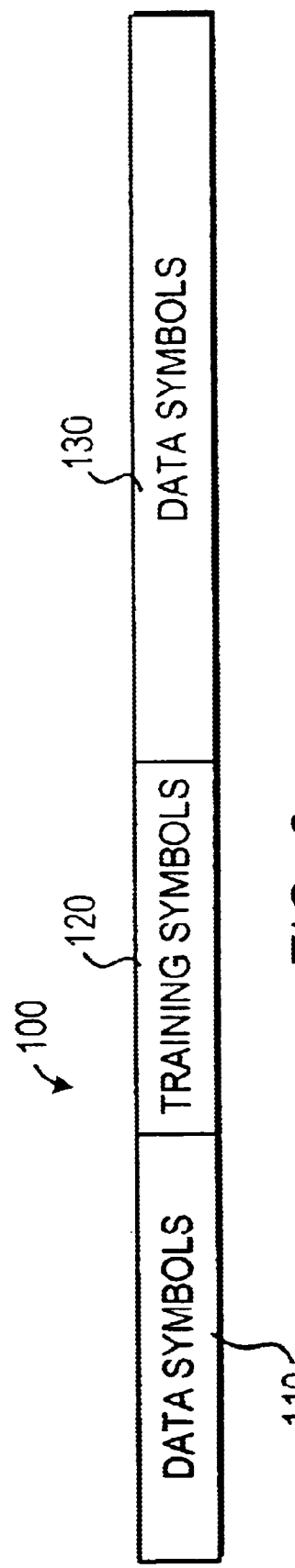
FIG. 3 is a block diagram of a partial structure of a burst in Global System For Mobile Communication digital communications system.
Figure 4:
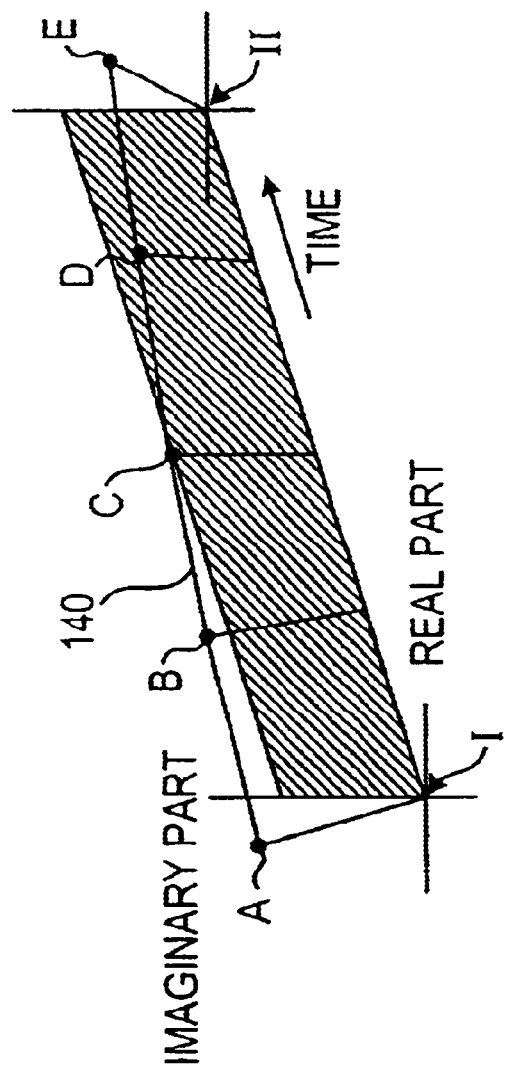
FIG. 4 is a graph illustrating the effect of a frequency offset on a burst over time.
Figure 5:
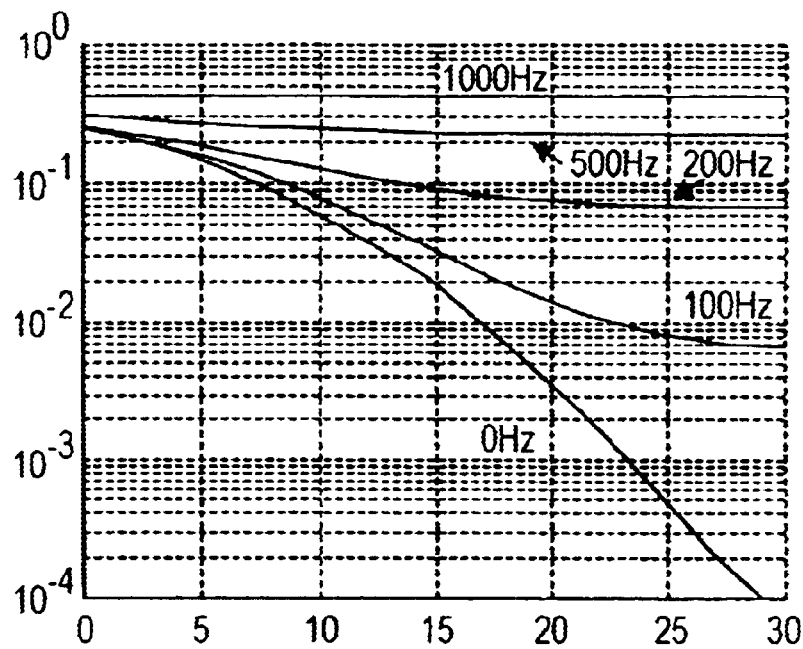
FIG. 5 is a graph illustrating the performance of a GSM system employing 8-PSK modulation without any frequency correction.
Figure 9:
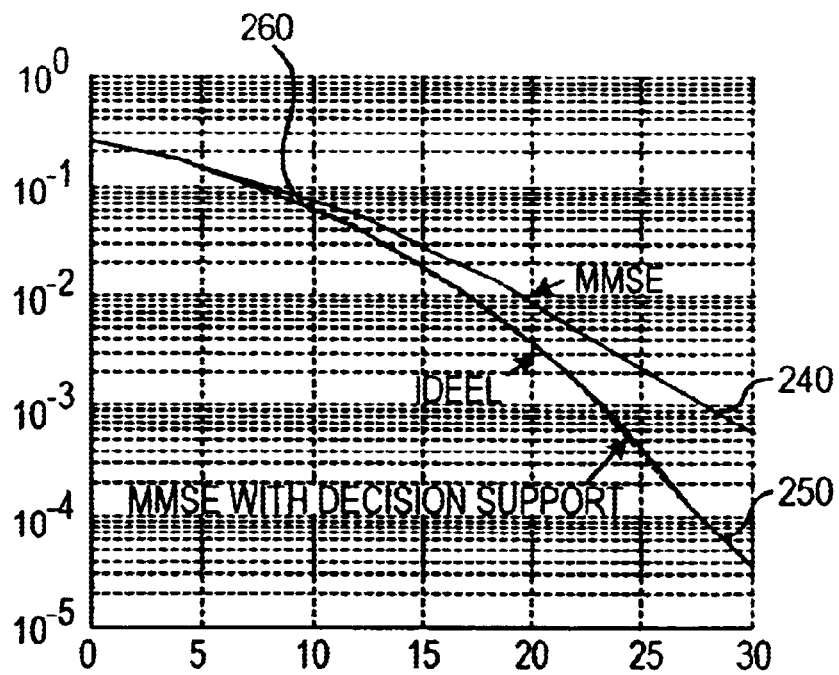
FIG. 9 is a graph illustrating the performance of a GSM system employing 8PSK modulation with a frequency correction unit.

FIG. 9 is a graph illustrating the performance of a GSM system employing 8PSK modulation with a frequency correction unit. That is, this figure illustrates how the invention counteracts frequency offsets and how it relates to and improves upon the prior art. On the x-axis is shown the signal-to-noise ratio in dB. The y-axis represents the bit-error rate. The curve labeled "ideal" shows the bit-error rate performance if the system is not disturbed by any frequency offset, as is the case in an ideal world. (This is the same curve as the curve labeled "0 Hz" in FIG. 5.) Curve 240 shows the performance of a system using the prior art single stage frequency correction (labeled "MMSE"), and curve 250 (labeled MMSE with decision support) shows the performance of a system using the two stage frequency correction of the present invention. Clearly, the performance of the present invention yields a much better system performance than the prior art solution, and almost has the same performance as the "ideal" curve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A method of automatic frequency correction of a radio signal comprising a sequence of data symbols and a training sequence transmitted at a transmitting frequency over a digital radio communication link and received by a receiver of a mobile communications system, wherein a frequency offset from the transmitting frequency occurs between the transmission and receipt of the sequence of symbols, comprising:

(a) receiving the radio signal at a receiver of a mobile communications system; and (b) processing the received radio signal in two processing stages, (i) the first processing stage comprising:

(A) calculating a first estimate of the frequency offset of the received signal using a portion of the training sequence in the received radio signal and a channel estimate of the channel over which the received radio signal was transmitted, while omitting the use of the data symbols in this calculation; and (B) correcting the frequency of the data symbols in the received radio signal a first time by the first estimate of the frequency offset to output a first set of frequency corrected data symbols; and (ii) the second processing stage comprising:

(A) calculating a second estimate of the frequency offset of the received radio signal using the first set of frequency corrected data symbols and the channel estimate; and (B) correcting the frequency of the data symbols in the received radio signal by the second estimate of the frequency offset, thereby restoring the signal to a frequency that is substantially the transmitting frequency.

2. The method of claim 1, further comprising calculating the channel estimate from the received radio signal.

3. The method of claim 1, wherein the first processing stage provides a coarse frequency correction of the frequency offset of the data symbols and the second processing stage provides a second frequency correction that fine tunes the first frequency correction.

4. The method of claim 1, wherein the step of calculating the first estimate of the frequency offset comprises calculating the first estimate using one of a least mean squares solution and a linear minimum mean-squared error solution.

5. The method of claim 4, wherein the step of calculating the second estimate comprises calculating the second estimate using one of a least mean squares solution and a linear minimum mean-squared error solution.

6. The method of claim 1, wherein the first frequency correction of the data symbols comprises back-rotating the received data symbols by an amount related to the first estimate of the frequency offset.

7. The method of claim 1, wherein the second frequency correction of the data symbols comprises back-rotating the received data symbols by an amount related to the second estimate of the frequency offset.

8. The method of claim 1, wherein the receiver comprises a digital signal processor and steps (b) is performed using the digital signal processor.

9. The method of claim 1, wherein the mobile communications system comprises a GSM system.

10. The method of claim 1, further comprising the receiver being informed of the contents of the training sequence in the receiver radio signal.

11. A receiver in a mobile communications system for receiving a radio signal transmitted over a digital radio communication link at a first frequency but received at an unknown second frequency due to a frequency offset occurring between the transmission and receipt of the radio signal, and for automatically correcting the frequency of the received radio signal, the received radio signal comprising a sequence of data symbols and a training sequence, the receiver comprising:

a processor for processing the received radio signal comprising means for processing the received radio signal in two stages to restore the received radio signal to substantially the first frequency:

(a) first means for calculating a first estimate of the frequency offset of the received radio signal using a portion of the training sequence in the received radio signal and a channel estimate of the channel over which the received radio signal was transmitting, while omitting the use of the data symbols in this calculation;

(b) first means for correcting the frequency of the data symbols in the received radio signal a first time by the first estimate of the frequency offset input from the first calculating means to output a first set of frequency corrected data symbols having a remaining frequency offset;

(c) second means for calculating a second estimate of the frequency estimate of the received radio signal using the first set of frequency corrected data symbols input from the first correcting means and the channel estimate; and (d) second means for correcting the frequency of the data symbols in the received radio signal by the second estimate of the frequency offset input from the second calculating means, thereby restoring the signal to a frequency that is substantially the transmitting frequency.

12. The system of claim 11, wherein the processor further comprises means for calculating the channel estimate from the received radio signal.

13. The system of claim 11, wherein the first processing stage provides a means for coarse frequency correction of the frequency offset of the data symbols and the second processing stage provides a means for a second frequency correction that fine tunes the first frequency correction.

14. The system of claim 11, wherein the first means for calculating the first estimate of the frequency offset comprises means for calculating the first estimate using one of a least mean squares solution and a linear minimum mean-squared error solution.

15. The system of claim 14, wherein the second means for calculating the second estimate comprises means for calculating the second estimate using one of a least mean squares solution and a linear minimum mean-squared error solution.

16. The system of claim 11, wherein the first means for correcting the frequency of the data symbols comprises means for back-rotating the received data symbols by an amount related to the first estimate of the frequency offset.

17. The system of claim 11, wherein the second means for correcting the frequency of the data symbols comprises means for back-rotating the received data symbols by an amount related to the second estimate of the frequency offset.

18. The system of claim 11, wherein the processor comprises a digital signal processor.

19. The system of claim 11, wherein the mobile communications system comprises a GSM system.

20. The system of claim 11, further comprising means for being informed of the contents of the training sequence in the radio signal.

* * * * *